United States Patent [19]

Blout et al.

[11] 4,345,862
[45] Aug. 24, 1982

[54] MODULAR FREIGHT BRACING BULKHEAD ASSEMBLY

[75] Inventors: Bennett O. Blout, Berwyn; James C. Ruffolo, Country Club Hills, both of Ill.

[73] Assignee: Evans Products Company, Portland, Oreg.

[21] Appl. No.: 207,406

[22] Filed: Nov. 17, 1980

[51] Int. Cl.³ .............................................. B60P 7/014
[52] U.S. Cl. .................................... 410/134; 49/449; 49/503; 410/138
[58] Field of Search ............... 105/376, 372, 375, 378; 410/134, 129, 130, 131, 132, 137, 138, 139, 140, 141, 142, 156, 121, 126, 127; 49/360, 361, 365, 371, 380, 394, 501, 503, 404, 409, 449; 160/113, 115, 118, 119, 130; 413/129, 133, 134, 138, 139

[56] References Cited

U.S. PATENT DOCUMENTS

| | | | |
|---|---|---|---|
| 2,516,527 | 7/1960 | Oltz | 410/142 |
| 3,336,880 | 8/1967 | Johnston | 410/131 |
| 3,348,337 | 10/1967 | Grasso | 49/503 X |
| 3,735,712 | 5/1973 | Krokos et al. | 410/134 |
| 3,741,127 | 6/1973 | Williams | 410/134 |
| 3,745,934 | 7/1973 | Williams | 410/133 |

*Primary Examiner*—Joseph F. Peters, Jr.
*Assistant Examiner*—M. J. Hill
*Attorney, Agent, or Firm*—Robert E. Howard

[57] ABSTRACT

A freight bracing bulkhead assembly having a bulkhead with easily removable freight engaging panels. The bulkhead is adopted to be suspended from a trolley system cooperating with overhead tracks in a cargo area for movement along the tracks. Locking means cooperating with the overhead tracks and with cooperating plates on the floor of the cargo area are actuated between a locked position and a released position by a linkage assembly located exteriorly of the modular panels.

2 Claims, 2 Drawing Figures

MODULAR FREIGHT BRACING BULKHEAD ASSEMBLY

BACKGROUND OF THE INVENTION

This invention relates to a freight bracing bulkhead assembly and more particularly to an improved bulkhead assembly that is light in weight and easier to repair than conventional bulkhead assemblies.

In the freight transportation field it is well known to employ movable bulkheads inside rail cars and truck trailers to prevent movement of the lading carried by the car or trailer. Such bulkhead assemblies are generally attached to crane rails located along the length of the cargo area on the upper side walls or ceiling thereof. The bulkheads are generally made of steel, although some are made of aluminum, and are supported from the crane rails by trolley assemblies. The bulkhead assemblies have a locking arrangement which permits the bulkhead to be immovably locked into place during transit of the car. One such locking arrangement is shown in U.S. Pat. No. 3,735,712 and comprises upper locking pins which engage the crane rail and lower locking pins which engage plates located in the floor of the car.

Where the bulkhead is of the type that has a metal skin or panel covering both sides of a frame in order to present solid or substantially solid load engaging faces to the lading being restrained, the linkage assembly used to actuate the locking pin assemblies passes through the load engaging faces of the bulkhead assembly and, in the event of damage to the load engaging face of the bulkhead assembly, the entire bulkhead must be removed from the rail car or trailer for repair. Such bulkhead assemblies are very heavy, which makes their removal difficult, and adds to the weight of the car.

It is, therefore, an object of this invention to provide a bulkhead assembly which can be easily repaired in the event of damage.

It is another object to provide a bulkhead which can be lighter in weight than conventional bulkhead assemblies.

SUMMARY OF THE INVENTION

A modular bulkhead assembly is provdided in which the linkage assembly for the locking pins is located exteriorly of the bulkhead panels. The bulkhead assembly is designed to permit easy removal of a damaged panel without removal of the entire bulkhead assembly from the rail car.

DETAILED DESCRIPTION OF THE PREFERRED EMBODIMENTS

Figure 1:
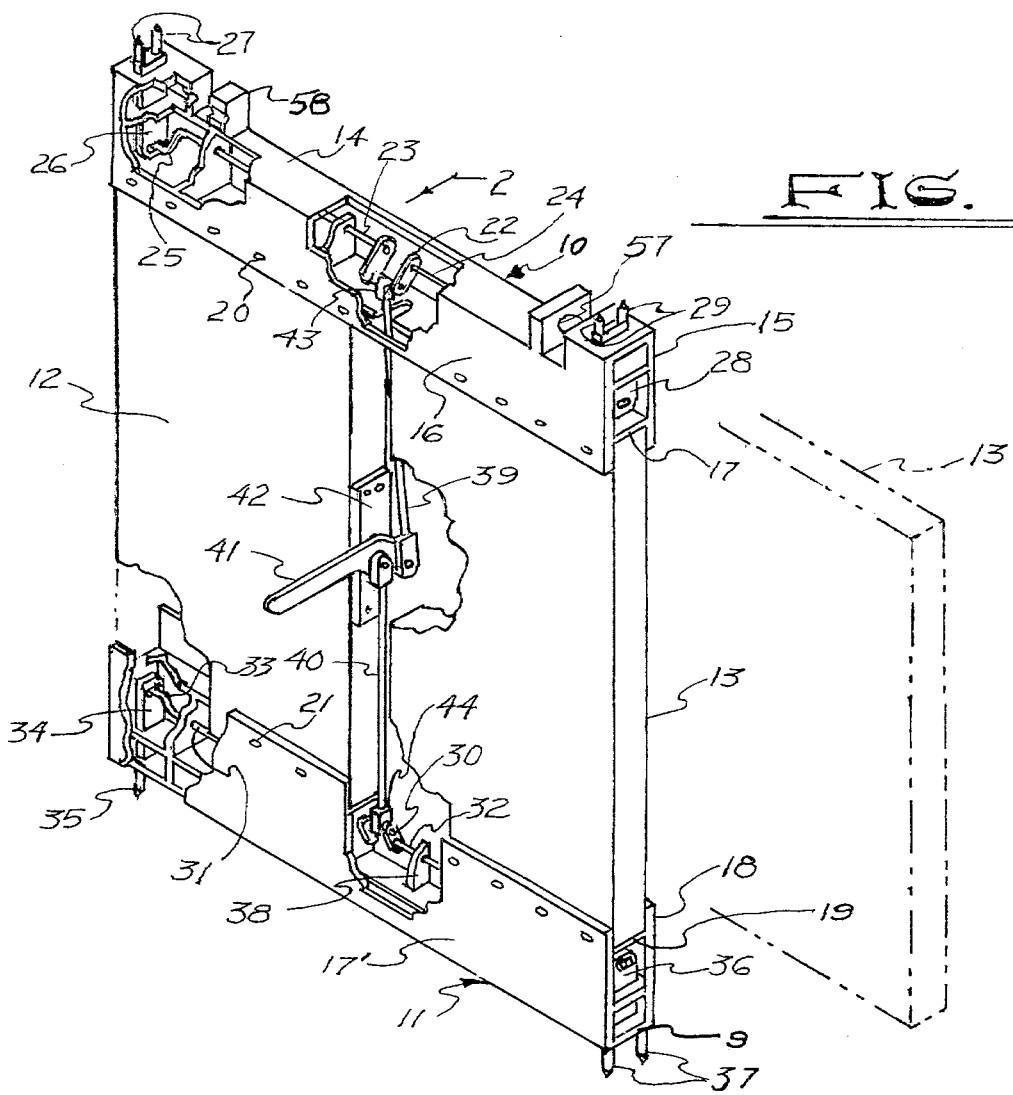
FIG. 1 is a perspective view, with a portion broken away, of the freight bracing bulkhead assembly of the invention.

The bulkhead assembly of the present invention is comprised of a horizontally disposed upper frame 10, a horizontally disposed lower frame 11 and modular panels 12 and 13.

Upper frame 10 is essentially an I-beam shaped member having a horizontal upper surface 14 and downwardly extending side walls 15 and 16. A horizontal plate 17 extends longitudinally along the interior of frame 10.

A lower frame assembly 11 has a similar construction to that of upper frame 10 and is comprised of a horizontally extending lower surface 9 having upwardly extending side walls 17' and 18. A lower horizontal plate 19 extends longitudinally along the interior of lower frame 11.

Modular panels 12 and 13 are placed into the channel formed by upper horizontal plate member 17 and downwardly extending side walls 15 and 16 of upper frame assembly 10 and are fastened thereto by means of fastening members 20. Similarly, modular panels 12 and 13 are inserted into the channel formed by lower plate member 19 and upwardly extending legs of side walls 17' and 18 of lower frame assembly 11. Modular panels 12 and 13 are connected to lower frame assembly 11 by means of fastening members 21. Each of said modular panels 12 and 13 has a horizontal dimension that is greater than one-third the length of said upper and lower frame assemblies 10 and 11, but less than one-half the length thereof.

As can be seen in FIG. 1, the locking pin assembly and its associated actuating mechanism is located substantially independent of modular panels 12 and 13. The locking pin assembly is comprised of an upper crank 22 connected to horizontally extending shafts 23 and 24. Horizontal shaft 23 is formed at its outer end into a cam or crank 25. Horzontal shaft 24 is similarly configured but is not shown in the drawing. Cam or crank 25, is in turn, connected to a locking pin forging 26 having a pair of upwardly extending locking pins 27 extending therefrom.

Similarly, the right side of the bulkhead assembly has a locking pin forging 28 with a pair of upwardly extending locking pins 29 extending therefrom.

A lower locking pin mechanism is comprised of a lower cam or crank 30 connected to horizontally extending shafts 31 and 32. The outer end of a shaft 31 is configured into a cam or crank 33. The outer end of shaft 32 similarly terminates in a cam or crank, not illustrated. Cam or crank 33 is connected to lower locking pin forging 34. Locking pin forging 34 has a pair of downwardly facing locking pins 35 extending therefrom.

Similarly, in the lower right portion of the bulkhead assembly, a locking pin forging 36 has downwardly extending locking pins 37 depending therefrom. Lower horizontal shaft 32 is journaled in an interior wall of the lower frame assembly designated by reference number 38. Horizontal shaft 31 is similarly journaled in an interior wall, not illustrated, as are upper horizontal shafts 23 and 24.

An upper tie rod 39 is connected to upper crank 22 in a vertical position, the lower end of which tie rod is connected to lever 41. A lower tie rod 40 is similarly connected to lever 41 at its upper end and at its lower end to lower crank 30. Lever 41 is attached to a vertical plate 42 which, in turn, is attached to modular panel 12. The upper end of upper tie rod 39 is connected to the upper crank 22 by means of a pivot pin 43. Similarly, lower tie rod 40 is connected to lower crank 30 by means of pivot pin 44.

Figure 2:
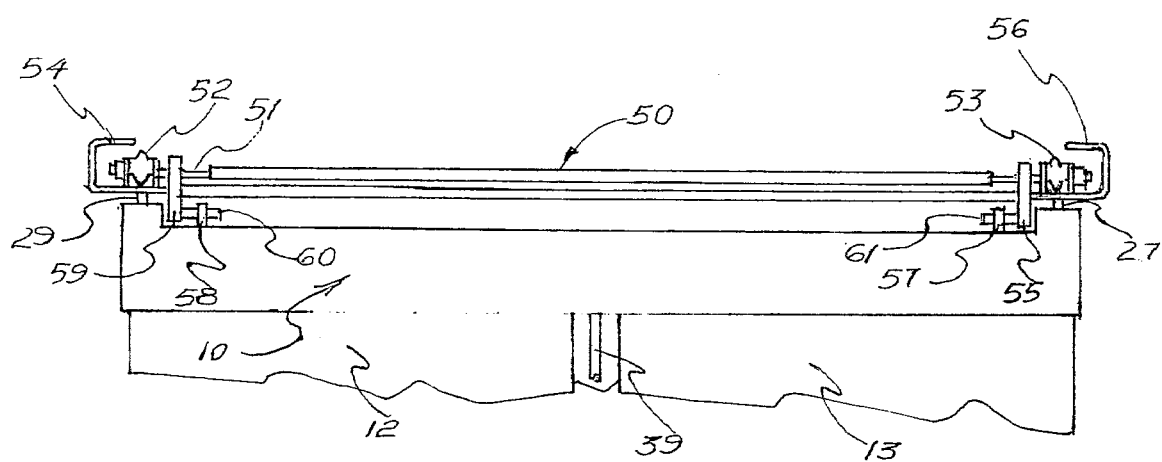
FIG. 2 is a front view of the upper portion of the bulkhead assembly showing the connection of the trolley assembly to the crane rails or tracks of a freight car or truck trailer.

The trolley assembly, 50, illustrated in FIG. 2, forms no part of the present invention and is more fully described in a preferred embodiment in co-pending application entitled "Trolley System For Freight Bracing Bulkhead Assemblies" filed of Nov. 17, 1981, Ser. No. 06/207,421. However, any conventional trolley assembly could be employed with the modular bulkhead assembly of the present invention, such as those described in U.S. Pat. Nos. 3,741,127 and 3,745,934.

Trolley assembly 50 is generally comprised of a trolley shaft 51 having sprocket wheels 52 and 53 at its outer ends. Sprocket wheels 52 and 53 are designed to engage apertures in crane rails or tracks 54 and 56, respectively. Crane rails 54 and 56 are attached to the upper interior of a railroad car or truck trailer in a manner well known to the art. The teeth of sprocket wheels 52 and 53 engage appropriately spaced apertures in the crane rail. Trolley assembly 50 is attached to the upper frame 10 via supporting plates 55 and 59, pins 60 and 61 and pivot attachments 57 and 58.

In the mode illustrated in FIG. 1, the locking pins are not extended and, therefore, would not engage the locking pin receiving apertures in the crane rails 54 and 56. Upon depressing lever or handle 41 to a vertical position from the horizontal position illustrated in FIG. 1, the linkage would act to outwardly extend all the locking pins so that they would engage the locking pin receiving apertures of the crane rails 54 and 56. In the latter position, the bulkhead assembly would be in a locked position and would not move along the crane rails. Upon retracting the handle to a horizontal position, such as that illustrated in FIG. 1, the locking pins would be retracted and disengaged from the crane rails, thereby permitting the bulkhead to be moved by means of the trolley assembly.

One of the features of the present invention is that the linkage assembly which actuates the locking pin mechanism is not located in a position relative to the panels of the bulkhead which would interfere with repair to damage to the panels. As illustrated, the locking pin linkage assembly or actuating mechanism is essentially located in the upper and lower frame assemblies and in the space between the modular panels 12 and 13, i.e., is located exteriorly of said panels. If a modular panel is damaged, such as, for example, modular panel 13, the bulkhead assembly can be moved to the area of the rail car door and, upon removal of the fastening members 20 and 21 can be slid outwardly and removed from the bulkhead assembly, as illustrated in phantom in FIG. 1. The removed modular panel can either be repaired or replaced with a new modular panel thereby obviating the necessity of removing the entire bulkhead assembly from the rail car.

Similarly, modular panel 12 can be removed from the bulkhead assembly but, in addition, the plate 42 attached thereto which supports lever 41 would have to be removed from the edge of panel 12. Alternatively, a vertical supporting member, not illustrated, could be connected to the upper and lower frame members 10 and 11 in a position adjacent to the edge of panel 12 for supporting plate 42, thereby enabling panel 12 to be removed without detaching plate 42 therefrom.

In a preferred embodiment of the present invention, the modular panels 12 and 13 can be constructed of wood rather than steel, such as a "butcher block" laminate, thereby lessening the weight of the entire bulkhead assembly. However, it is to be understood that the modular panels are not limited to being constructed of wood but could be constructed of other light weight materials or of steel.

We claim:

1. A freight bracing bulkhead adapted to be suspended from a trolley cooperating with overhead tracks in a cargo area comprising an upper frame and a lower frame, said upper frame having spaced apart vertical members connected by a horizontal member which define a downwardly facing channel in said upper frame, said lower frame having spaced apart vertical members connected by a horizontal member which define an upwardly facing channel in said lower frame, two panel members extending between said upper and lower frames, the upper ends of said panel members being received in the downwardly facing channel of said upper frame and the lower ends of said panel members being received in the upwardly facing channel of said lower frame, means removably connecting said panel members to said upper and lower frames, each of said panels having a horizontal dimension that is greater than one-third the length of said upper and lower frames but less than one-half the length thereof, locking means located at the ends of said upper and lower frames and movable between an extended, locked position to a retracted, released position, and linkage means communicating said locking means with actuation means for moving said locking means between said locked position and said released position, said linkage means and said actuation means being located exteriorly of said panel means.

2. The freight bracing bulkhead of claim 1 wherein said panels are spaced apart and said linkage means is located within said upper and lower frames and in the space between said panels.

* * * * *